Feb. 27, 1934.   H. KREUSLER   1,949,020
DISPLAY MECHANISM
Filed May 31, 1932   2 Sheets-Sheet 1
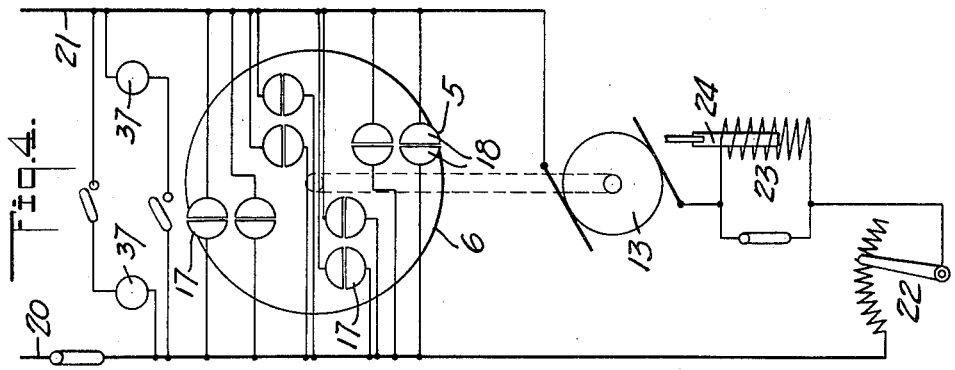
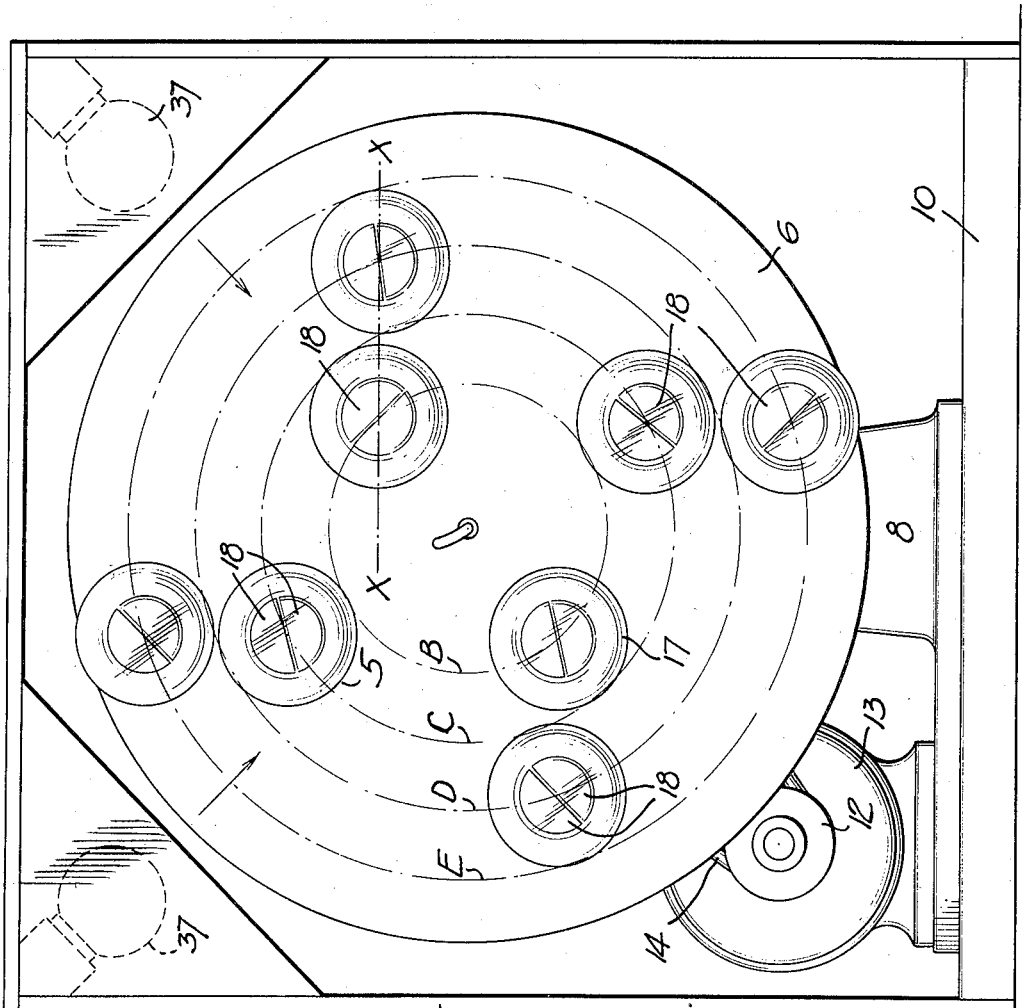
INVENTOR.
HERMAN KREUSLER
BY
ATTORNEYS.

Feb. 27, 1934.  H. KREUSLER  1,949,020
DISPLAY MECHANISM
Filed May 31, 1932  2 Sheets-Sheet 2
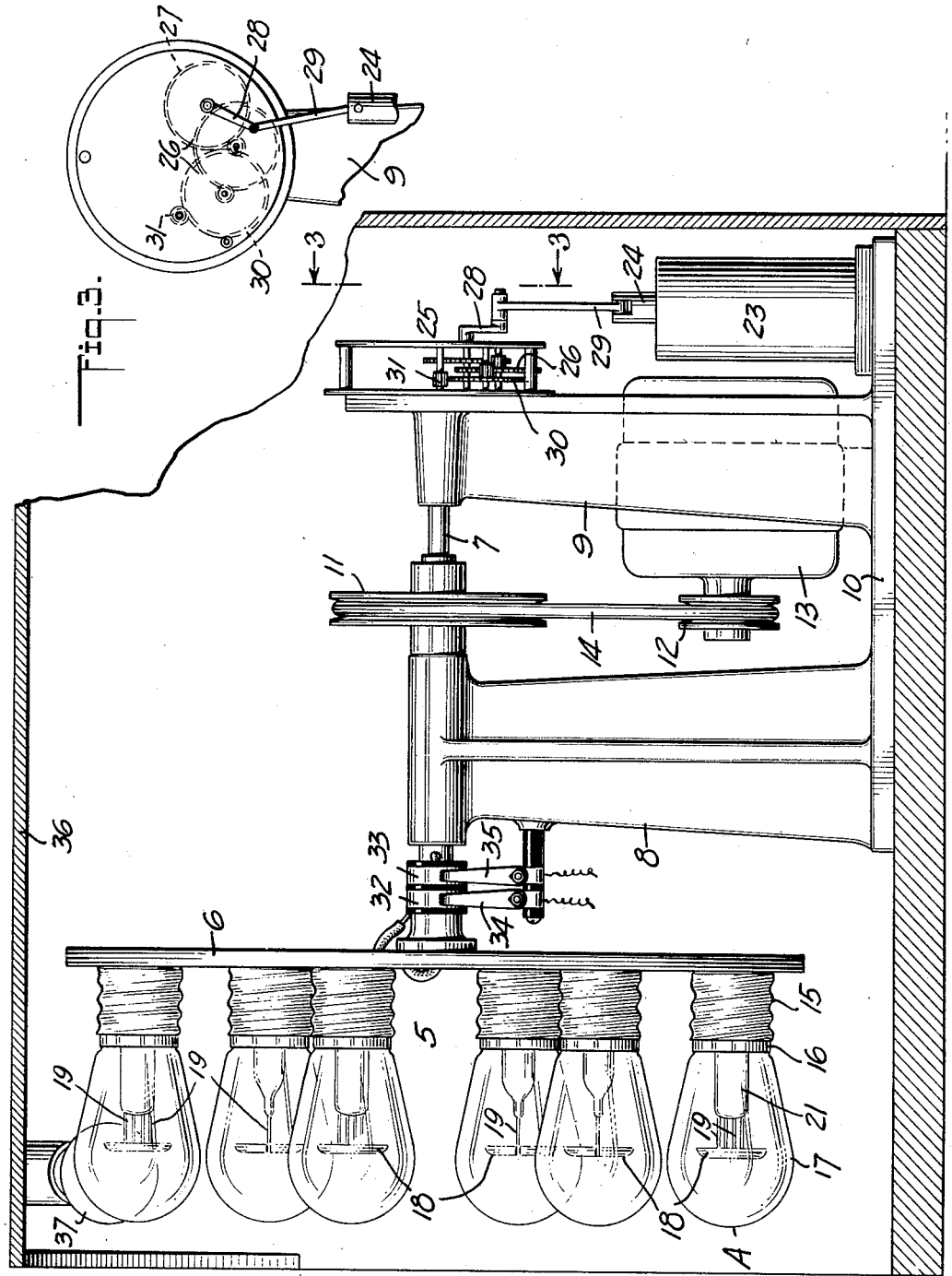

Patented Feb. 27, 1934

1,949,020

UNITED STATES PATENT OFFICE 1,949,020

DISPLAY MECHANISM

Herman Kreusler, Los Angeles, Calif.

Application May 31, 1932. Serial No. 614,557

3 Claims. (Cl. 240—10.1)

My invention relates generally to the class of optics, and same has particular reference to display mechanisms.

If one looks intently with one eye upon a bright light giving device against a black background, the eye will at first be normally sensitive to all types of light given by the glow giving device. As one persistently looks at the bright glow giving device the sensitivity of the eye to certain types of light will become deadened and the glow giving device will appear to gradually change in color as the portions of the eye which record the physiological colors become fatigued. This change of color will apparently pass through the ocular spectrum in reverse order.

If the position of the glow giving device is shifted while the eye continues to stare at the position previously occupied by the device, for an instant the glow giving device will appear to remain in its original position and appear to be of the same color as when last in the original position. Then, as the vision is persistently maintained on the position originally occupied by the glow giving device, those different portions of the eye that record the physiological colors will recover at different times and cause the image that continues in the original position to pass through the ocular spectrum.

I have discovered that, when the light giving device is moved, the image thereof, continuing in the path thereof, varies from that of the light giving device to the opposite color as the image fades out; thus if the light giving device is red, the last and faintest portion of the image will be green.

It is an object of my invention to rotate a plurality of light giving devices arranged in various combinations so that a great variety of multicolored patterns will be formed and will change periodically before the eye of an observer to give numerous pleasing effects. I employ light giving devices that glow only at the peak of an alternating current and uniformly over the surface of a small plate of metal to cause a definite spot of light to be produced at the position occupied by one of such devices at the instant of the peak of the alternating current and thereby produce a definite pattern of images and a stroboscopic effect which is the same as though a great many successively glowing lights were provided on a disk and spaced the distance travelled by the device during the period of the alternating current and as though the interval of time between the flashing on and off of consecutive lights were that of the period of the alternating current. A great many definitely defined images are produced and the spacing thereof changes with changes in speed of rotation to cause many pleasing patterns to be formed.

Another object of my invention is to produce an attractive light, opaque in its nature, adapted to be used as a border in place of the commonly used neon borders and other glaring types of lights.

Having thus given an outline of the present invention, I will now proceed to describe same in detail, with reference to the accompanying drawings, in which Figure 1 is a view in front elevation of the mechanism;

Figure 2 is a section through the shadow box showing its normal relation to the exhibiting surface of the contained mechanism;

Figure 3 is a diagrammatic illustration of the electrical circuit employed;

Figure 4 is a view in elevation of the means for automatically changing the speed of rotation of the lamp section.

In carrying out my invention, I employ a lamp system 5 wherein use is made of a vertical disk 6, the same mounted on one end of a horizontal driven shaft 7. This shaft is journaled in the brackets 8 and 9 which rise from a supporting plate 10. The said shaft carries a fixed pulley 11 and trained thereover and over the pulley 12 of a driving motor 13 is a belt 14 by means of which power will be transferred to the shaft when the motor is in operation. I will later describe how variable speeds can be taken into said shaft, whereby the aforementioned disk 6 may be rotated with any velocity that may be desired to bring about many changes in the optical effect of the lamp system upon the eye of the observer.

The said disk 6 supports the horizontally positioned receptacles or sockets 15 which removably receive the customary metallic shells 16 of glow lamps 17, obviously in such manner that current from a source of potential will be taken into the lamps to satisfy those ends which I will describe hereinafter. Each of the said glow lamps consists of a sealed envelope, preferably, but not necessarily, formed of clear glass, and located therein are semi-circular glow surfaces 18 of conducting material adapted, when connected to a source of potential, to provide opposite terminals of an electric circuit. The envelope contains neon or other gas which will ionize and become incandescent at the surface of one of the terminals, preferably when the difference of potential between the terminals is that which occurs at the peak of an alternating current. The glow surfaces are positioned in a plane common to each other and they are so related as to appear to the eye as a divided circular disk, and, as illustrated, these surfaces are disposed at right angles to the long axis of the receptacle which contains them, and they are located in spaced relation to the forward concave of said receptacle. By forward concave, I have reference to the inner surface of the smooth spherical-like front clear walls at the end A of said receptacle. The diameter of the disk formed by the two glow surfaces 18 is appreciably less than the internal diameter of the glass walls of the receptacle which surrounds them. Concerning each glow lamp 17 and on reference to Figure 2 of the drawings, it is noted that each of the glow surfaces 18 is supported by an electrode 19, the respective electrodes being connected with the leads 20 and 21 which constitute part of the circuit shown in Figure 4. It is also noted that the electrodes are supported from the glass stem 21 of the envelope and that they extend forwardly, a suitable distance, to afford a resilient mounting for said glow surfaces. This is in order that the said surfaces will be made to vibrate more or less when the disk 6 is in motion, thereby adding certain desirable advantages to the general scheme of the invention and making it possible to broaden the optical effect and increase the number of multicolored designs to be formed and to vary, to some extent, no doubt, the angle of projection of certain of the color beams, and compelling the beams to cross each other.

In the accompanying drawings, I show eight lamps or light giving devices arranged in series of two each, with the lamps of each series diametrically opposed to each other so that those of the respective series will proceed over the respective concentric paths B, C, D and E. The maximum external diameters of the envelopes of the respective lamps of one series project laterally onto the courses or paths over which the lamps of adjacent series of lamps travel. It will also be observed that the lamps are arranged in series of two and that a line X—X drawn across the ends A passes at a tangent an imaginary circle described at the center of the disk 6. This, I find, also assists in the thought of building up a large number of very fascinating designs and motives at the front or exhibiting side of the disk 6.

In Figure 4 I have shown an electrical circuit 19 (preferably alternating current) which includes the input and output wires 20 and 21 with the lamps 17 in multiple in said circuit. In the said circuit is the motor 13 hereinbefore described; a manually controlled rheostat 22 and an automatically functioning inductive resistance 23 in which latter is an adjustable core 24. It is by means of this inductive resistance and a mechanism 25 that I am able to cause the disk to rotate at variable speeds. The said mechanism 25 consists of a gear train 26, the gear 27 of which carries a crank arm 28, which latter is operatively connected with the core 24 by a pitman rod 29. The gear 30 of the said train is in constant mesh with a gear pinion 31 on the shaft 7. By thus actuating the core 24 I am able to vary the speed at which the disk 6 revolves and by thus changing the speed of said disk I am able to greatly vary the optical effect at the said front or exhibiting side of the disk. Maximum, minimum and various intermediate speeds will be had, and I find that aside from the actual change brought about in the spectral colors produced, I am able to bring about conditions that give rise to the creation of various pleasing illusions. When the disk 6 is at rest and current is flowing through the glow giving devices, the spectra formed thereby contains red and violet colors to very perceptible degrees, but when the disk is placed in motion and as may depend upon its particular speed at the time, additional colors manifest themselves and are quite clear to the eye, and during other times still other colors show themselves. Certainly all of the primary colors of the solar spectrum are to be found at the display or exhibiting surface of said disk.

Current collecting rings 32 and 33 are carried by the shaft 7 and same are in contact with the respective brushes 34 and 35, the latter connected in said circuit 19. These rings are properly insulated from the shaft 7 and same, of course, are connected with the glow surfaces 18 so as to feed current thereto.

The entire device may be mounted in the form of receptacle shown at 36, the display end of which is open. The device may be used for advertising purposes or in any manner that may mark or satisfy the choice of the user. When motion is to be set up in association with still light, such as neon signs or the like, one or more of the devices may be used to advantage, either at the border of the sign or at some other suitable place.

An interesting color effect is obtained by connecting the terminals 20 and 21 to a source of direct current, rendering lamps 17 inactive by loosening same in the sockets 15 and rotating the disk. This causes a constant light from lamps 37 to be thrown on the envelopes and glow surfaces of the lamps 17. The eye of an observer looking toward the exhibition surface of the disk will receive beams of the constant light, which are reflected by the envelopes and the glow surfaces. The images continuing in the path of the surfaces that reflect these beams of light seem to vary from the color of the light reflected toward the opposite physiological color for a short distance in the path of each reflecting surface before an overlapping of images occurs. This effect and that of the combination of overlapping images causes an interesting color display. A multicolor stroboscopic effect is produced by using alternating current in place of direct current and operating the mechanism as last described. It is to be understood that the reflecting surfaces are considered to be light giving devices.

It is intended that the color of the lamps 37 be varied and be used when lamps 17 are operated to produce changes in the optical effect.

The important principle of operation of my mechanism is most apparent when all the lamps are rendered inactive except one lamp 17 and the terminals are connected to a source of alternating current. It is preferable that the gas contained in the envelope of the lamp be such that, when the potential difference between the glow surfaces is at a maximum, portions thereof will ionize and become incandescent uniformly over one of the glow surfaces and that as soon as the difference in potential drops a little below the maximum the portions of the gas will cease to be incandescent. When the potential difference is again at maximum and the glow surfaces are of opposite polarity portions of the gas will become incandescent over the other glow surface. It is also preferable that a gas be used which, when incandescent over one of the glow surfaces, will cause the same to appear as a glowing mass of light which is principally red and yellow. As the lamp starts to move in an orbital path a very sharply defined image is produced at the position occupied by each one of the glow surfaces when the same is caused to appear as a glowing mass. A series of sharply defined images appears to remain in the path of the glow surfaces. The first image is of a bright red-yellow and the following images vary to the opposite physiological color as they fade out. As the speed of rotation of the mechanism is increased, the first image may travel to the position of some of the other images before they have entirely faded out to cause overlapping of the images and produce a multicolored pattern effect. When one first glances at such a display, the red and yellow lights seem to predominate. As the observer continues to intently watch the display, his optical senses become more or less fatigued and lose their sensitivity to the red and yellow rays of light, which causes the opposite colors in the optical spectrum to become very apparent in the display.

When the rest of the lights 17 are rendered operative, the overlapping and varied arrangement of the images continuing in the path of the glowing surfaces causes very interesting multicolored patterns to be produced. As the speed of rotation of the mechanism is varied, the spacing of the images and the rate at which certain images overtake other images is varied, causing a display which appears to constantly be moving and changing in different directions; for example, annular bands of color are formed, which look like an illuminated mass the shape of a revolving rope apparently varying in structure and seeming, at times, to rotate in a direction opposite to that of rotation of the disk. The distinctness of pattern produced in the annular bands of colored designs is caused by the production of a sharply defined image which is made possible by the use of light giving devices in which, for a very small instant of time, there is produced a clearly defined spot of light of uniform intensity over the area thereof.

The annular movement of the light giving devices causes the light thereof to be distributed throughout the annular patterns produced to give a relatively soft, opaque effect. My mechanism is intended to be used as an advertising device and the interesting and opaque nature of the display is intended to be attractive to observers without unnecessarily distracting their attention from the matter to be observed.

I claim:

1. In a display mechanism, a plurality of electrically operable glow plates for intermittently producing instantaneous incandescent effects uniformly over defined areas, movable means for holding said plates in spaced apart relationship and for placing the same in motion as a unit, and means cooperable with the movable means for supplying a fluctuating electric current to said plates to render same effective for the intermittent production of incandescent effects uniformly over defined areas while said plates are in motion.

2. In a display mechanism, a plurality of spaced apart and definitely shaped plates; supporting means for holding said plates in relative spaced apart relationship and for placing the said plates in motion as a unit, the supporting means including electrically operable means for intermittently producing instantaneous incandescent effects uniformly over the surfaces of said plates; and means co-operable with the supporting means for supplying a fluctuating electric current to said electrically operable means to render same effective for the intermittent production of instantaneous incandescent effects uniformly over the surfaces of said plates while the said plates are in motion as a unit.

3. In a display mechanism, a plurality of spaced apart semi-circular plates; supporting means for holding said plates in relative spaced apart relationship and for placing said plates in motion as a unit, the supporting means including electrically controlled means for intermittently producing instantaneous red-yellow incandescent effects uniformly over the surfaces of said plates; and means co-operable with the supporting means for supplying a fluctuating electric current to said electrically controlled means to render same effective for the intermittent production of instantaneous red-yellow incandescent effects uniformly over the surfaces of said plates while the plurality of said plates are in motion as a unit.

HERMAN KREUSLER.